United States Patent [19]

Yoshida et al.

[11] 4,380,576
[45] Apr. 19, 1983

[54] AIR CELL

[75] Inventors: Kazumasa Yoshida; Michio Watabe, both of Yokohama, Japan

[73] Assignee: Toshiba Battery Co., Ltd., Tokyo, Japan

[21] Appl. No.: 336,459

[22] Filed: Dec. 31, 1981

[51] Int. Cl.³ .......................................... H01M 4/00
[52] U.S. Cl. ...................................... 429/27; 429/43
[58] Field of Search ................................ 429/27-29, 429/43

[56] References Cited

U.S. PATENT DOCUMENTS 4,104,197  8/1978  Heffler .............................. 429/27 X
4,255,498  3/1981  Yoshida .............................. 429/27

Primary Examiner—Charles F. LeFevour
Attorney, Agent, or Firm—Oblon, Fisher, Spivak, McClelland & Maier

[57] ABSTRACT

An air cell of the invention has an air cathode, one surface of which is in contact with an electrolyte and the other surface of which is in contact with air. The air cathode has current collecting grids, a carbon powder, a binder and a metal chelate. The current collecting grids are located at the center of the air cathode. The concentration of the binder in an area of the air cathode which is in contact with the electrolyte beyond the current collecting grids is lower than the concentration of the binder in an area of the air cathode which is in contact with the air.

5 Claims, 5 Drawing Figures

AIR CELL

BACKGROUND OF THE INVENTION

This invention relates to improvements on an air cell, and more particularly to improvements on an air cathode.

The prior art cell comprises liquid electrolyte and an air cathode prepared by mixing powdered or granular active carbon particles with a water-repellent binder such as powder of Teflon and compressing the mixture into a thin sheet while being carried by a conductive holder such as a nickel net.

The conventional air cell of the above-mentioned type had the drawbacks that the electrolyte pervaded the air cathode due to capillarity during long storage or long period discharge at an extremely small current to thickly cover the surface of the active carbon particles used as one component of the air cathode, thereby prominently decreasing the surface area of the active carbon which could be contacted by air with a decline in the oxygen-reducing power, discharge area and consequently discharge voltage.

The concentration of the water-repellent binder has great effects on the discharge characteristics of the air cell. When the concentration is small, the discharge characteristics within the initial period are good. However, during storage, the electrolyte covers the surface of the cathode and long storage may not be possible. On the other hand, when the concentration is great, the working voltage becomes lower.

SUMMARY OF THE INVENTION

It is an object of the present invention to provide an air cell which is excellent in discharge and storage characteristics.

In order to achieve this object, there is provided according to the present invention an air cell comprising an air cathode, one surface of which is in contact with an electrolyte and the other surface of which is in contact with air; said air cathode having a current collecting grid, a carbon powder, a binder and a metal chelate, said current collecting grid being located at a center of said air cathode, and a concentration of the binder in an area of said air cathode which is in contact with the electrolyte beyond said current collecting grid being lower than a concentration of the binder in an area of said air cathode which is in contact with the air.

DESCRIPTION OF THE PREFERRED EMBODIMENTS

Figure 1:
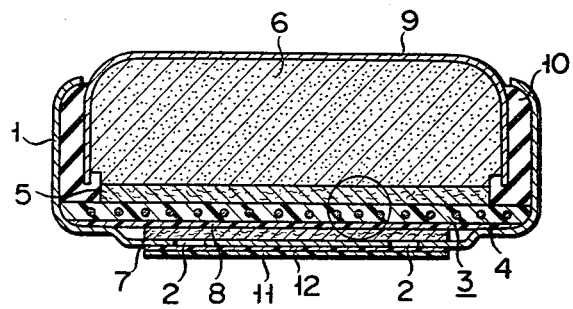
FIG. 1 is a sectional view of an air cell according to an embodiment of the present invention.

The air cell according to the embodiment of the present invention will be described with reference to FIG. 1.

A cathode terminal 1 also serves as a cathode can and has air inlets 2 at the bottom. An air cathode 3 has, as its center, current collecting grids 4 of an alkali-resistant metal. An electrolyte-holding layer 5 holds a caustic alkali electrolyte. This electrolyte-holding layer 5 is made of an unwoven fabric or a porous material which is excellent in alkali resistance. The electrolyte-holding layer 5 is in contact with an anode 6 made of gelated zinc powder. One surface of a paper sheet 7 of excellent air permeability is in contact with the air cathode 3 through an air-permeable membrane 8 of Teflon having a number of micropores. The other surface of the paper sheet 7 is in contact with the bottom of the cathode can 1 having the air inlets 2. A gasket 10 is filled in the space between an anode can 9 and the cathode can 1. A sealing member 11 seals the air inlets 2 at the bottom of the cathode can 1 through a pressure-sensitive adhesive 12. The sealing member 11 is removed when the air cell is used.

Figure 2:
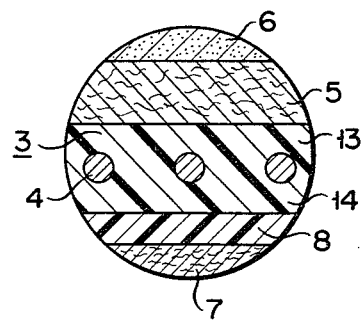
FIG. 2 is an enlarged sectional view of a part of the air cell as indicated by a circle area in FIG. 1.

The air cathode 3 is divided by the current collecting grids 4, as shown in FIG. 2, into a first region 13 containing a smaller amount of a water-repellent binder and a second region 14 containing a greater amount of the water-repellent binder. The first region 13 is in contact with the electrolyte-holding layer 5. The second region 14 is in contact with the air through the air-permeable membrane 8 and the paper sheet 7.

The air cathode 3 described above is prepared in the manner described below. First a mixture of 80 parts by weight of an active carbon powder containing a metal chelate as an oxidation-reducing catalyst and 20 parts by weight of Teflon powder is heated at about 150° C. while it is simultaneously pressed by hot rollers to form a first sheet of 0.2 to 0.3 mm thickness. Another mixture of 40 parts by weight of the active carbon powder containing the metal chelate and 60 parts by weight of Teflon powder is treated in the same manner as described above to form a second sheet of 0.2 to 0.3 mm thickness. Current collecting grids consisting of 80 mesh nickel nets are clamped between these first and second sheets. The obtained laminate is heated under pressure by hot rollers to obtain the air cathode 3 in which the first and second sheets and the current collecting grids are formed integrally with each other.

In the air cathode 3 of the air cell of the present invention, as shown in FIG. 2, the concentration of the binder of the first region 13 of the air cathode 3 at the side of the electrolyte is low, so that the contact area between the electrolyte and the first region 13 may be made wide. Therefore, an air cell of low anodic polarization and high working voltage may be obtained. Since the second region 14 of the air cathode 3 at the side of the air inlets 2 beyond the current collecting grids 4 has a higher concentration of the binder, the electrolyte may not permeate into the second region 14. Accordingly, the contact area between the air cathode 3 and the air may be made wide, and the entire area of the air cathode may not be wet by the electrolyte during long storage, so that the high oxidation-reducing characteristic may be maintained for a long period of time. The air cathode 3 has a small polarization tendency and a high oxidation-reducing characteristic.

Figure 3:
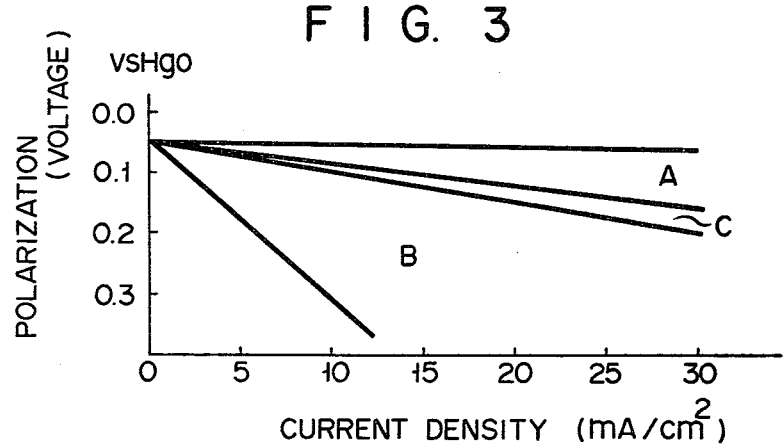
FIG. 3 is a graph showing the relationship between the polarization and the current density taking the concentration of the water-repellent binder as a parameter.
Figure 4:
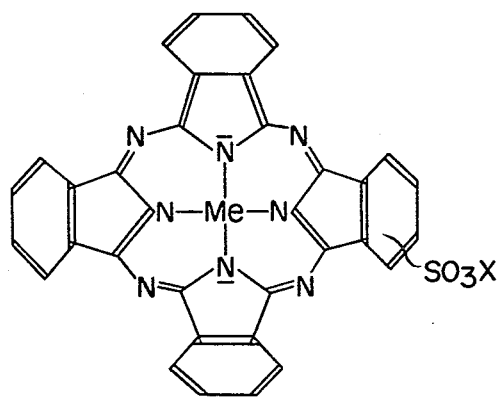
FIG. 4 shows the structural formula of a sulfonated metal phthalocyanine.

FIG. 3 is a graph showing the polarization characteristic when the Teflon (binder) concentration in the air cathode is varied. This graph shows the polarization values of the air cathode having the current collecting grids at the center and pressed into a sheet form of 0.3 mm thickness, in relation to the current density per apparent unit surface area. Air cathodes were tested which respectively fell under an A region in which the Teflon concentration was 5 to 50% by weight, a B region in which the Teflon concentration was 52 to 90% by weight, and a C region in which the Teflon concentration was 50 to 52% by weight. With the air cathode which fell under the A region, the electrolyte permeated to the air cathode during long storage. With the air cathode which fell under the B region, the permeation of the electrolyte into the air cathode was not observed at all. With the air cathode which fell under the C region, slight permeation of the electrolyte into the air cathode was observed. Therefore, the first region 13 falling under the A region and the second region 14 falling under the B region can be pressed together with the current collecting grids interposed therebetween to provide the air cathode 3 having long service life of the present invention as shown in FIG. 2.

According to the present invention, the porous air cathode may be made of a volatile fluid organic material such as kerosene or kerosene residue having an evaporation point within the range of 240° to 290° C. For example, a mixture of 40 parts by weight of an active carbon powder containing 2 to 50% by weight of a metal chelate, 30 parts by weight of Teflon powder, and 30 parts by weight of kerosene is well kneaded. The mixture is then pressed by rollers to form a first sheet of 0.2 to 0.3 mm thickness. Another mixture of 30 parts by weight of the same active carbon, 40 parts by weight of Teflon powder, and 30 parts by weight of kerosene is well kneaded. This mixture is pressed in the same manner as described above to form a second sheet which has a high concentration of Teflon powder (binder) than the first sheet and which has a thickness of 0.2 to 0.3 mm. The current collecting grids consisting of 80 mesh nickel nets are clamped between these first and second sheets. The laminate thus obtained is thermally treated at a temperature of 200° C. for 30 minutes to evaporate the kerosene and to obtain the porous air cathode having a porosity of 30 to 60%.

In the porous air cathode of the air cell according to the present invention, the three-phase interface is easily obtained between the solid phase surface of the active carbon containing the metal chelate, the liquid phase surface of the electrolyte, and the gas phase surface of the external air. For this reason, excellent oxidation-reducing power is obtained. Furthermore, by suitably adjusting the mixing ratio of the volatile fluid organic material, the porosity may be correctly set. By selecting the kind of fluid organic material to be employed, extremely small pores defining a capillary structure may also be obtained. When this capillary structure is obtained, the surface area of the air cathode is increased, so that the oxidation-reducing power is improved and high load characteristics as obtained.

The metal chelates preferably used in the present invention may include metal phthalocyanines and metal porphyrins. In these metal chelates, the metal may be selected from a transition element such as cobalt, nickel, copper, iron, manganese, and ruthenium. The atom of such a metal is symmetrically surrounded by the four nitrogen atoms in the metal chelate.

The particularly preferable metal chelate is a metal phthalocyanine including a sulfone group, which is obtained by substituting a hydrophilic sulfone group, $-SO_3X$ (where X denotes H, Na, K, Li or $NH_4$), in the benzene ring of the phthalocyanine. When the sulfone group is substituted into the metal phthalocyanine which is insoluble in water, the metal phthalocyanine becomes soluble in water. Therefore, the active carbon may be easily impregnated with the metal chelate as the catalyst in the form of an aqueous solution, resulting in an advantage. The number of sulfone groups to be substituted in the benzene ring may be 1 to 4 per one molecule of the metal phthalocyanine. In any case, the obtained metal chelate is effective as the oxidation-reducing catalyst for the air cathode. The metal phthalocyanine having the sulfone group is soluble in water. However, little of the metal phthalocyanine dissolves in the electrolyte of the cell when it is brought into contact therewith, since the salt concentration, such as with caustic potash, in the electrolyte is very high. Therefore, the metal phthalocyanine effectively serves as the catalyst for the air cathode.

According to the present invention, the metal phthalocyanine as a catalyst which is insoluble in water is sulfonized to render it soluble in water, so that the amount of the metal phthalocyanine which may be dissolved in water may be increased. Therefore, by using a metal chelate solution of high concentration, the step of applying the catalyst including the impregnation of the active carbon with the metal chelate solution and the drying may be eliminated, resulting in less labor and time. Furthermore, since water may be used as the solvent of the metal chelate in place of the organic solvent, only water is scattered during drying, so that the working environment may be improved.

Figure 5:
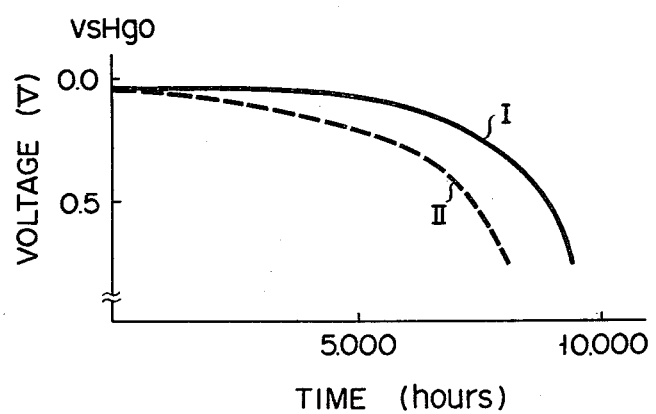
FIG. 5 is a graph showing the anodic polarization discharge curves when the heat treatment of the air cathode is performed and when it is not performed.

When the active carbon applied with the metal phthalocyanine catalyst having the sulfone group is thermally treated in an atmosphere of an inert gas such as nitrogen, argon or the like at 300° to 1,300° C. before forming the air cathode, the service life of the air cathode is improved. FIG. 5 shows the anodic polarization discharge curves at the constant current density of 10 $mA/cm^2$ at 20° C. when (I) the heat treatment was performed in an inert gas and (II) when the heat treatment was not performed. When the heat treatment is performed, the number of conjugated double bonds in the metal phthalocyanine increases and stabilizes over a long period of time because of the heating, so that the oxidation-reducing power may be maintained over a long period of time. According to the present invention, carbon black or graphite may be used in place of the active carbon as the carbon powder component of the air cathode.

Thirty samples (A) of the air cells of the present invention were prepared, each having a diameter of 11.5 mm and an overall height of 5.2 mm, and having an air cathode with the first and second regions having different concentrations of the water-repellent binder with the current collecting grids interposed therebetween. Thirty samples (B) of the air cells were prepared according to the conventional method, each having an air cathode of uniform binder concentration with the current collecting grids located at the center. Ten samples each of (A) and (B) were discharged at the initial period. The remaining twenty samples each of (A) and (B) were stored at 25° C. The ten samples each of (A) and (B) which were stored at this temperature were discharged at a constant current of 1.5 mA after 6 months and 12 months, respectively. The discharge capacities of the samples were measured with reference to the discharge capacity 100 at the initial period. The obtained results are shown in Table below:

TABLE

| Storage period (25° C.) | Change in discharge capacity (%) | | |
|---|---|---|---|
| | Initial period (%) | After 6 months (%) | After 12 months (%) |
| Present Invention (A) | 100 | 98–95 | 93–90 |
| Control (B) | 90 | 80 | 70 |

As may be seen from the Table above, the initial capacities and the capacities after storage of the samples (A) of the present invention are superior to those of the samples (B) of the prior art.

What we claim is:

1. An air cell comprising an air cathode, one surface of which is in contact with an electrolyte and the other surface of which is in contact with air; said air cathode having a current collecting grid, a carbon powder, a binder and a metal chelate, said current collecting grid being located at a center of said air cathode, and a concentration of the binder in an area of said air cathode which is in contact with the electrolyte beyond said current collecting grid being lower than a concentration of the binder in an area of said air cathode which is in contact with the air.

2. An air cell according to claim 1, wherein said air cathode is porous.

3. An air cathode according to claim 1 or 2, wherein the metal chelate including a metal phthalocyanine or metal porphyrin, a metal atom of the metal chelate is symmetrically surrounded by four nitrogen atoms, and the metal is a transition element.

4. An air cell according to claim 1, wherein the metal chelate has 1 to 4 groups of the general formula —$SO_3X$ (wherein X is a member selected from the group consisting of hydrogen, sodium, potassium, lithium and ammonium).

5. An air cell according to claim 4, wherein a mixture of a carbon powder and a metal chelate is heat treated at a temperature of 300° to 1,300° C. in an atmosphere of inert gas prior to forming the air cathode.

* * * * *